(12) United States Patent
Hur et al.

(10) Patent No.: US 7,929,500 B2
(45) Date of Patent: Apr. 19, 2011

(54) HOME BASE TRANCEIVER STATION APPARATUS USING PACKET NETWORK IN A MOBILE COMMUNICATION SYSTEM AND METHOD THEREOF

(75) Inventors: Suk-Kyun Hur, Yongin-si (KR); Chang-Soo Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 11/822,796

(22) Filed: Jul. 10, 2007

(65) Prior Publication Data

US 2008/0009286 A1    Jan. 10, 2008

(30) Foreign Application Priority Data

Jul. 10, 2006    (KR) .................. 10-2006-0064200

(51) Int. Cl.
  *H04B 7/216*    (2006.01)
(52) U.S. Cl. ........................... 370/335; 370/331
(58) Field of Classification Search .................. None
  See application file for complete search history.

(56) References Cited

U.S. PATENT DOCUMENTS

| 7,440,573 | B2 * | 10/2008 | Lor et al. ............... 380/270 |
| 2002/0058495 | A1 * | 5/2002 | Chow et al. ............ 455/406 |
| 2004/0022237 | A1 * | 2/2004 | Elliott et al. ............ 370/356 |
| 2006/0079274 | A1 | 4/2006 | Gallagher et al. |

FOREIGN PATENT DOCUMENTS

| KR | 1020000035889 | 6/2000 |
| KR | 100612698 | 8/2006 |
| KR | 1020060097076 | 9/2006 |

* cited by examiner

*Primary Examiner* — Erika A Gary
(74) *Attorney, Agent, or Firm* — Roylance, Abrams, Berdo & Goodman, LLP

(57) ABSTRACT

A system using a packet network in a mobile communication system is provided, in which a home BTS provides a mobile communication service to an MS using a packet network as a backhaul network, a home BTS manager provides information necessary for providing the mobile communication services to the home BTS and manages the home BTS, a security gateway resides between the home BTS and upper network elements and protects a network of the mobile communication system against the packet network, a WSS performs a call control and mobility control function for the MS through the home BTS, and a WGW transcodes voice data transmitted from the MS via the home BTS.

26 Claims, 7 Drawing Sheets

HOME BASE TRANCEIVER STATION APPARATUS USING PACKET NETWORK IN A MOBILE COMMUNICATION SYSTEM AND METHOD THEREOF

CROSS-REFERENCE TO RELATED PATENT APPLICATION

This application claims priority under 35 U.S.C. §119(a) from Korean Patent Application No. 2006-0064200, filed on Jul. 10, 2006 in the Korean Intellectual Property Office, the entire disclosure of which is incorporated herein by reference.

BACKGROUND OF THE INVENTION

1. Field of the Invention

The present invention relates to a mobile communication system and method thereof. More particularly, the present invention relates to a home Base Transceiver Station (BTS) apparatus using a packet network as an interface network, instead of a dedicated interface network.

2. Description of the Related Art

Since their commercialization, mobile communication systems have been developed to be a promising substitute for wired telephony infrastructural communications. However, installation of dedicated interface networks between Mobile Stations (MSs) and Base Stations (BSs) involves high costs in the mobile communication systems.

FIG. 1 illustrates a network configuration of a conventional mobile communication system.

Referring to FIG. 1, the conventional mobile communication system includes a Mobile Switching Center (MSC) 130 for taking charge of calls with the mobile communication system and calls with a Public Switched Telephone Network (PSTN) 160, a Base Station Controller 140 (BSC) for taking charge of wireless calls with MSs 110 and 120 and connections to a Packet Support Node (PSN) 150 and the MSC 130, BTSs 165 and 167 for interfacing between the MSs 110 and 120 and the BSC 140 under the control of the BSC 140, and the PSN 150 for connecting the MSs 110 and 120 to an Internet 170. Network Elements 180 provide necessary information to other network elements.

The PSN 150 may include a Packet Data Serving Node (PDSN) and a Packet Control Function (PCF). The MS 110 can provide Internet connectivity as it is installed in a Personal Computer (PC) or a laptop computer in the form of a Personal Computer Memory Card International Association (PCMCIA) card or a Universal Serial Bus (USB).

The above network elements are interfaced based on the following interface standard.

FIG. 2 illustrates communication interfaces in the conventional mobile communication system.

Referring to FIG. 2, the interface standard is known as the InterOperability Standard (IOS) proposed for a Code Division Multiple Access (CDMA) mobile communication system.

After reference point signifies a point between BSs 250, 260, Aquinter reference point signifies a point between the BS 250 and PCF 240, and Aquarter reference point signifies a point between the PCF 240 and PDSN 235.

Each of BSs 250 and 260 has a BTS 257 or 267 and a BSC 255 and 265. The BSs 250 and 260 are connected by A3 and A7 interfaces. The A3 interface carries signals and traffic and the A7 interface is used for signaling.

The BSs 250 and 260 are connected to a PCF 240 by an A9 interface for signaling and an A6 interface for traffic transmission.

The PCF 240 is connected to a PDSN 235 by an A11 interface for signaling and an A10 interface for traffic transmission. The PDSN 235 is connected to the Internet and equipped with routing, billing, and Point-to-Point Protocol (PPP) connection functions.

The BSs 250 and 260 are connected to an MSC 230 by an Al interface for signaling and A2 and A5 interfaces for traffic transmission.

The MSC 230 is connected to an InterWorking Function (IWF) 232, for providing data service to MSs. The data service is available to the MSs through the PCF 240 and the IWF 232 in CDMA 2000 1× and its successors.

Physical standards, E1/T1, Optic, Satellite, Microwave, etc. can support the above-described dedicated interfaces.

Because dedicated interfaces are needed between the BSs 150 and 260 and the MSC 230, there may exist areas in which mobile communication services are not available due to the absence of such dedicated interfaces.

Accordingly, there exists a need for an improved apparatus for enabling signaling and data transmission between network elements without using a dedicated interface.

SUMMARY OF THE INVENTION

Exemplary embodiments of the present invention address at least the above problems and/or disadvantages and provide at least the advantages below. Accordingly, an aspect of exemplary embodiments of the present invention is to provide a home BTS apparatus for providing connectivity over a packet network in a mobile communication system.

Another aspect of exemplary embodiments of the present invention is to provide an apparatus for enabling mobile communication services to be available in hot spots or in areas to which mobile communication signals are not propagated in a mobile communication system.

A further aspect of exemplary embodiments of the present invention is to provide an apparatus for providing mobile communication services to MSs over an existing packet network in a mobile communication system.

According to an aspect of exemplary embodiments of the present invention, there is provided a system using a packet network in a mobile communication system, in which a home BTS provides a mobile communication service to an MS using a packet network as a backhaul network, a home BTS manager provides information necessary for providing the mobile communication services to the home BTS and manages the home BTS, a security gateway resides between the home BTS and the home BTS manager and protects a network of the mobile communication system against the packet network, a WSS performs a call control and mobility control function for the MS through the home BTS, and a WGW transcodes voice data transmitted from the MS via the home BTS.

BRIEF DESCRIPTION OF THE DRAWINGS

The above and other objects, features and advantages of certain embodiments of the present invention will become more apparent from the following detailed description when taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a home BTS apparatus using a packet network in a mobile communication system. The home BTS apparatus is installed with low cost in a certain area so as to support signal transmission/reception over the backhaul network between a BTS and a BSC.

Figure 1:
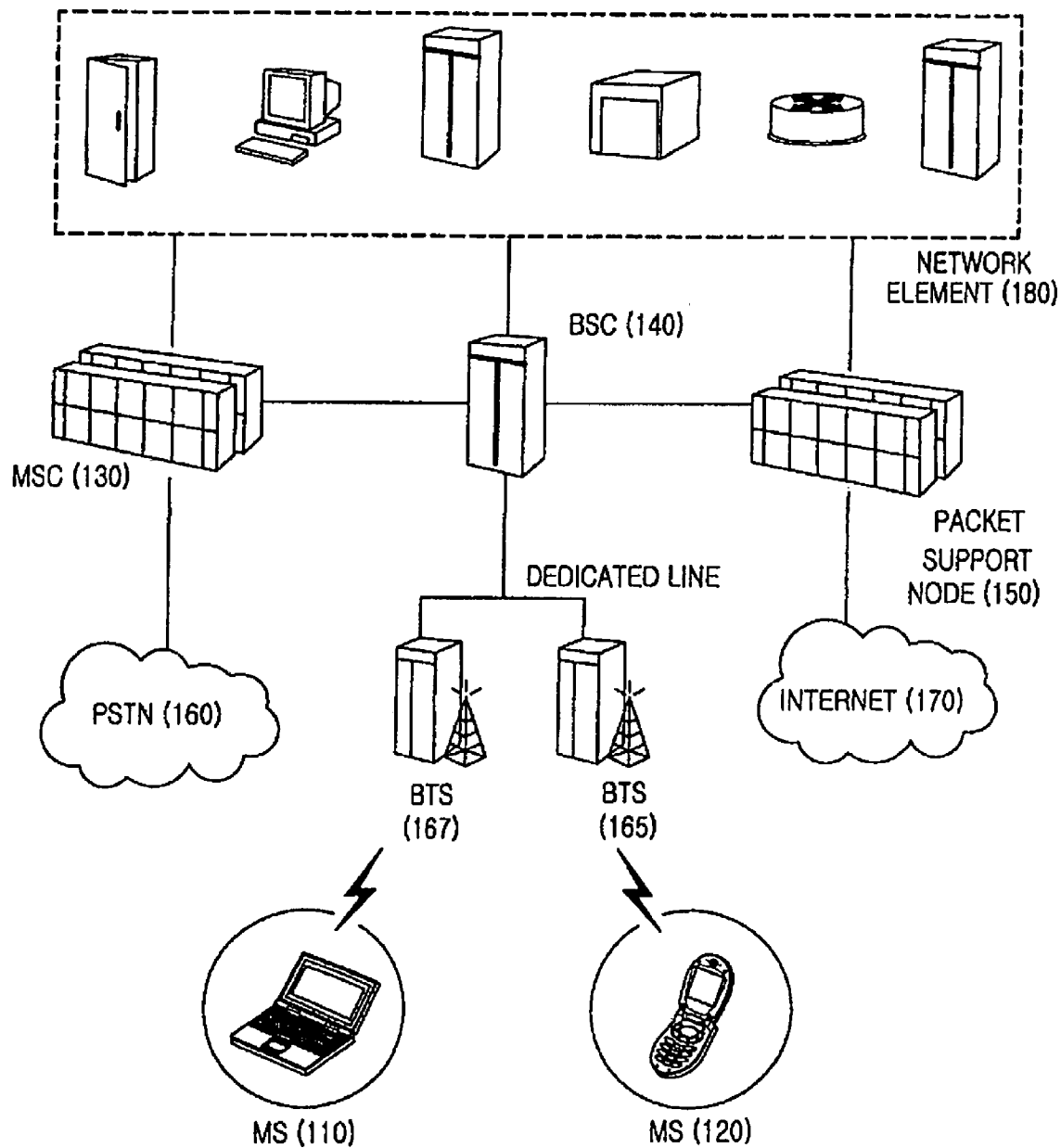
FIG. 1 illustrates a network configuration of a conventional mobile communication system.
Figure 2:
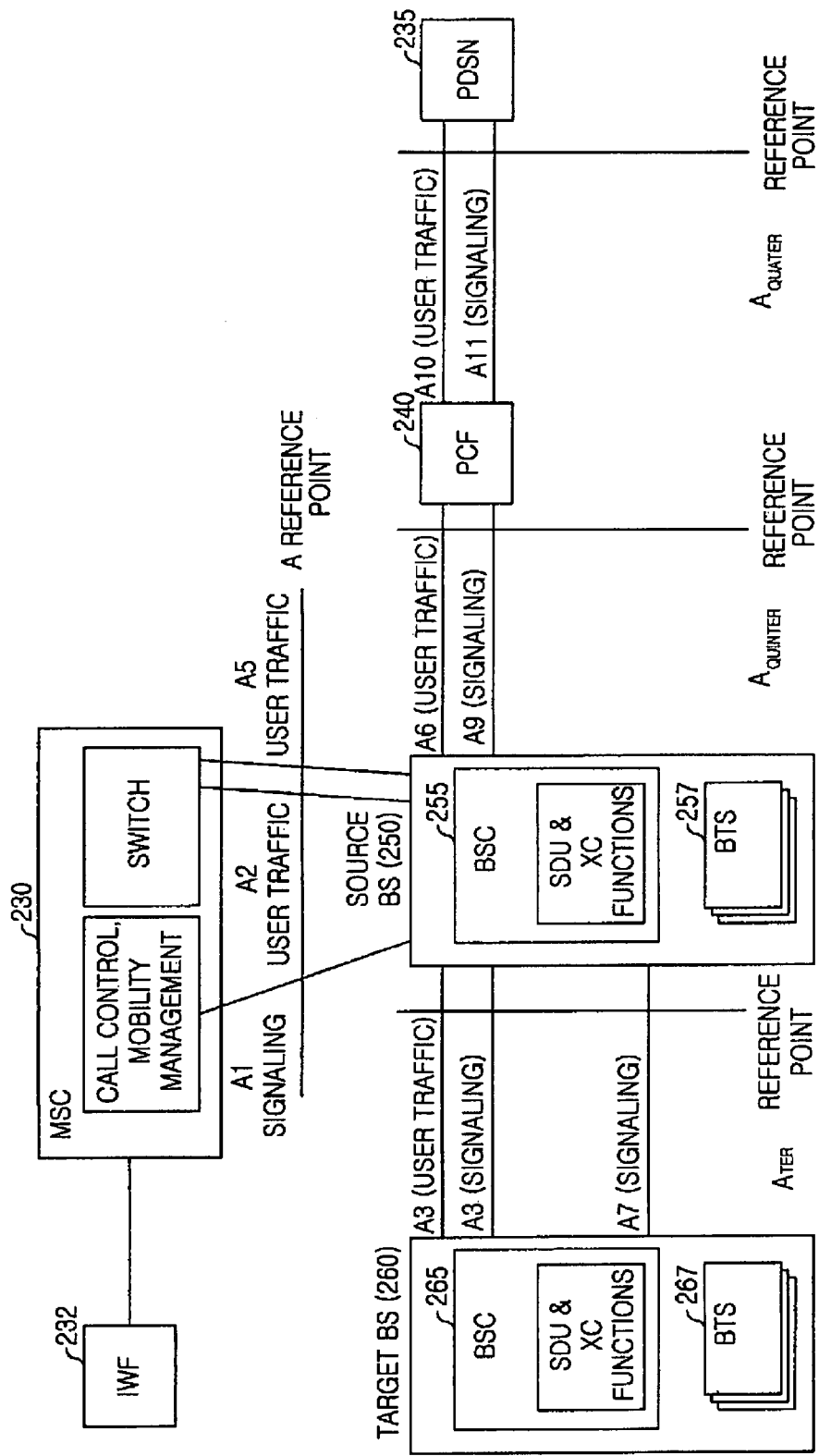
FIG. 2 illustrates communication interfaces in the conventional mobile communication system.
Figure 3:
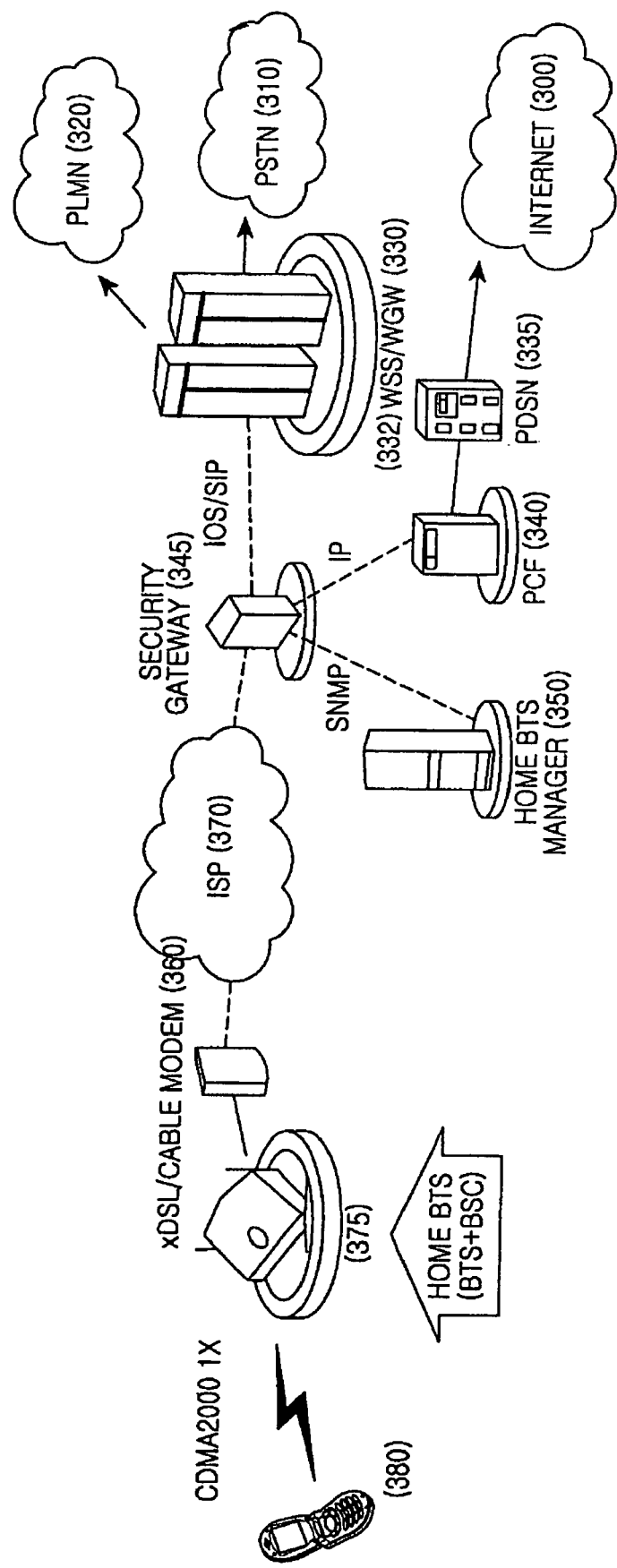
FIG. 3 illustrates a configuration of a mobile communication system supporting a home BTS according to an exemplary embodiment of the present invention.

FIG. 3 illustrates a configuration of a mobile communication system supporting a home BTS according to an exemplary embodiment of the present invention.

Referring to FIG. 3, a home BTS 375 basically has the functionalities of a conventional BTS and a BSC. In addition, the home BTS 375 supports the following functionalities.

First, the home BTS 375 uses a packet network supporting broadband communications as a backhaul network and is connected to the packet network via x Digital Subscriber Line/Cable Modulator-Demodulator (xDSL/Cable MODEM) 360. The home BTS 375 provides CDMA 2000 1× or CDMA 1×Evolution-Data Only (EV-DO) service to its connected MSs. The home BTS 375 accesses the packet network by fast Ethernet-based Internet Protocol (IP) connectivity.

Also, the home BTS 375 encrypts an IP packet using an IP Security (IPsec) technology by interworking with a security gateway 345.

The home BTS 375 supports fault and information reporting. It defines faults, which do not impose a load on the system, checks for faults, and sounds an alarm according to the type of fault upon generation of the fault, thus reporting the fault to a home. BTS manager 350.

The home BTS 375 supports plug and play. When the home BTS 375 is connected to the mobile communication system, it can establish a set of configurations autonomously. The set of configurations include auto self-installation and configuration, auto CDMA channel selection, and auto CDMA Pseudo-Noise (PN) planning.

The home BTS 375 supports adaptive Radio Frequency (RF) functionality. When the home BTS 375 is installed in an area already having a CDMA BTS, it maintains a call with an MS that it services with minimal influence on communications of the CDMA BS.

The home BTS 375 has Virtual Private Network (VPN) IP support functionality. The home BTS 375 is allocated an IP address from an Internet Service Provider (ISP) 370 by a Dynamic Host Configuration Protocol (DHCP) client function and communicates using the IP address via a VPN.

The home BTS 375 can enable handover between the home BTS 375 and a general BTS for an MS 380. When the MS 380 moves from the home BTS 375 to the general BTS by the handover, the home BTS 375 provides a beacon by which the MS 380 can sense the home BTS 375.

The structure of the home BTS 375 will be described later with reference to FIG. 6.

The security gateway 345 supports security to the mobile communication network against the packet network. It mainly provides firewall and IPsec functionalities.

A PCF 340 and a PDSN 335 enable the MS 380 to receive a data service through the home BTS 375. The PCF 340 and the PDSN 335 operate in compliance with the conventional interface standard.

The PDSN 335 carries out PPP connection, IP address allocation, and billing to provide the data service to the MS 380 and connect to internet(300).

The home BTS manager 350 monitors and manages the home BTS 375 remotely. The home BTS manager 350 stores a Medium Access Control (MAC) address, a Frequency Assignment (FA), a PN offset, authentication information, and the like for the auto self-installation and configuration of the home BTS 375 and provides them to the home BTS 375. The home BTS manager 350 also manages subscribers to control access of subscribers.

Upon receipt of alarm information from the home BTS 375, the home BTS manager 350 downloads a software program to the home BTS 375 so that the cause of an alarm generated in the home BTS 375 can be eliminated.

The home BTS manger 350 provides an administration account for which security is supported over the VPN to the home network 375. The home BTS manager 350 also provides information associated with repair and maintenance to the home BTS 375 as long as the information does not impose a load.

The home BTS manager 350 diagnoses a fault reported by the home BTS 375. When the home BTS 375 is initially powered-up, the home BTS manager 350 provides necessary information including subscriber information (e.g. subscriber Electronic Serial Number/International Mobile Subscriber Identifier (ESN/IMSI)), an IP address, and security options.

The home BTS manager 350 provides data necessary for software upgrade in the home BTS 375 so that software can be automatically upgraded in the home BTS 375.

A WSS 332 is a soft switch operating in compliance with the IOS and provides handoff functionality like the conventional MSC in the mobile communication system.

The WSS 332 conducts communications with an upper node by an Interim Standard-41 (IS-41) protocol and a Signaling System 7 (SS7) protocol and controls MSs' mobility and calls. That is, the WSS 332 acts as the conventional MSC.

A WGW 330 is a type of media gateway. It converts voice data converted by a specific Coder-Decoder (CODEC) of an MS to an IP packet, converts the IP packet to Pulse Code Modulation (PCM) data, and then provides the PCM data to a local exchange of a PSTN 310. When transmitting the voice data to another WGW, the WGW 330 just converts the voice data to an IP packet prior to transmission. Data conversion from one type of CODEC to another type of CODEC is called transcoding. Besides the format conversion of traffic data, the WGW 330 performs control operations such as flow control for the traffic data, jitter control, and silence suppression. The WGW 330 are connected to Public Land Mobile Network (PLMN) 320 for wireless communication and connected to Public Switched Telephone Network(PSTN) 310 for wired communication.

The structures of the WSS 332 and the WGW 330 will be described later with reference to FIG. 7.

The above-described network elements are interfaced in the following manner.

Figure 4:
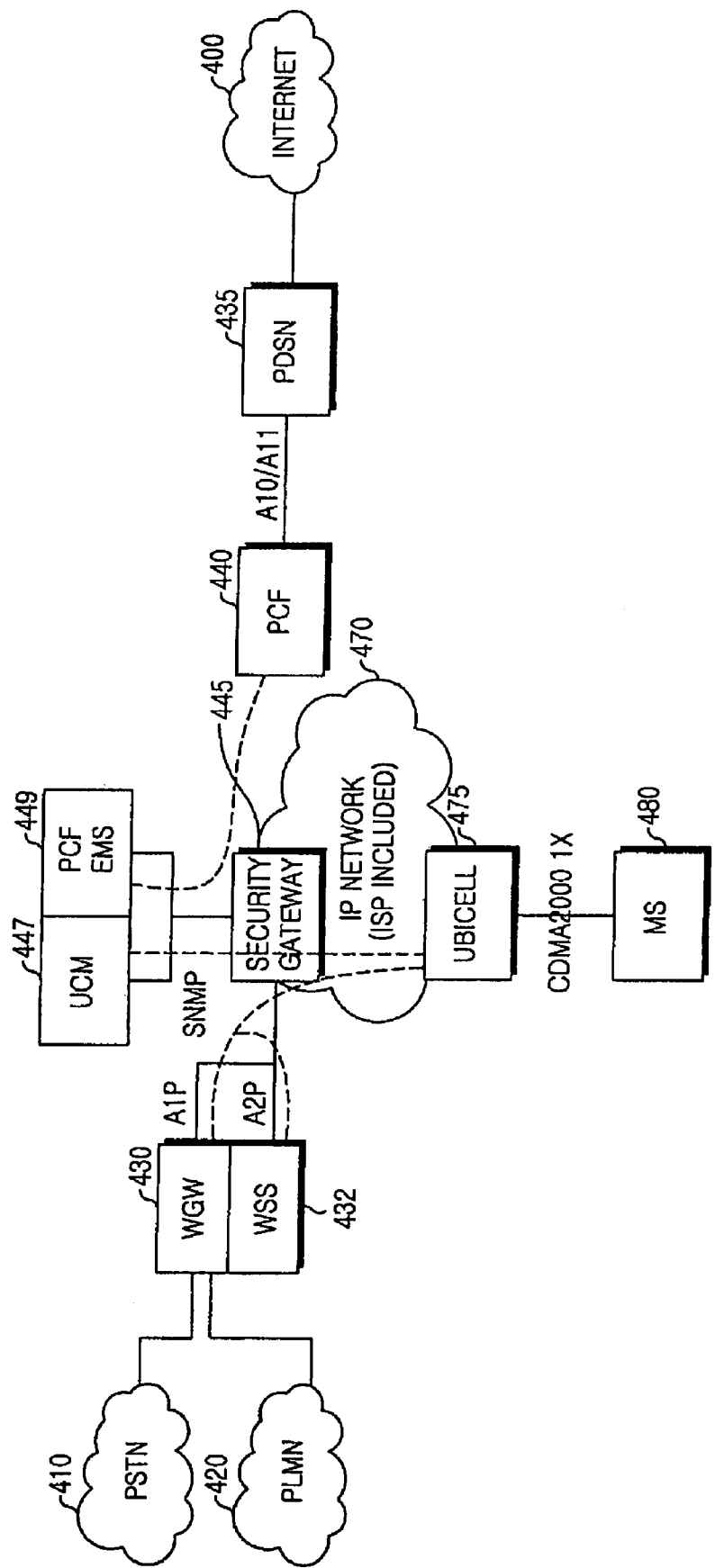
FIG. 4 illustrates communication interfaces in the mobile communication system supporting the home BTS according to an exemplary embodiment of the present invention.

FIG. 4 illustrates communication interfaces in the mobile communication system supporting the home BTS according to an exemplary embodiment of the present invention.

Referring to FIG. 4, a UbiCell 475 is a home BTS and a UbiCell Manager 447 is a home BTS manager.

An MS 480 is connected wirelessly to the UbiCell 475, complying with the CDMA 2000 1×EV-DO standard. The UbiCell 475 is connected to a PCF 440 by a fast Ethernet-based IP connection and operates based on an IOS A8/9 interface protocol.

The UCM 447 and the UbiCell 475 communicate with each other via a fast Ethernet-based IP connection in compliance with Simple Network Management Protocol/Trivial (File Transfer Protocol)/Hyper Text Transfer Protocol (SNMP/T(FTP)/HTTP.

A security gateway 445 and the UbiCell 475 are connected using IP network 470 and the security gateway 445 is responsible for security between the UbiCell 475 and other network element using security protocol like IPSec.

The PCF 440 communicates with a Packet Control Function Element Management System (PCF EMS) 449 according to a predetermined standard based on fast Ethernet. Communications are conducted between the PCF 440 and a PDSN 435 based on the IOS standard. The PCF EMS 449 manages the PCF 440. The PDSN 435 is connected to internet 400.

The UbiCell 475 and a WSS 432 are connected by a fast Ethernet-based IP connection. For signaling, they use the A1 interface standard of the IOS or its modification. The UbiCell 475 is connected to a WGW 430 by a fast Ethernet-based IP connection. For signaling, they use the A2 interface standard of the IOS or its modification.

The WGW 430 are connected to PLMN 420 for wireless communication and connected to PSTN 410 for wired communication.

Figure 5:
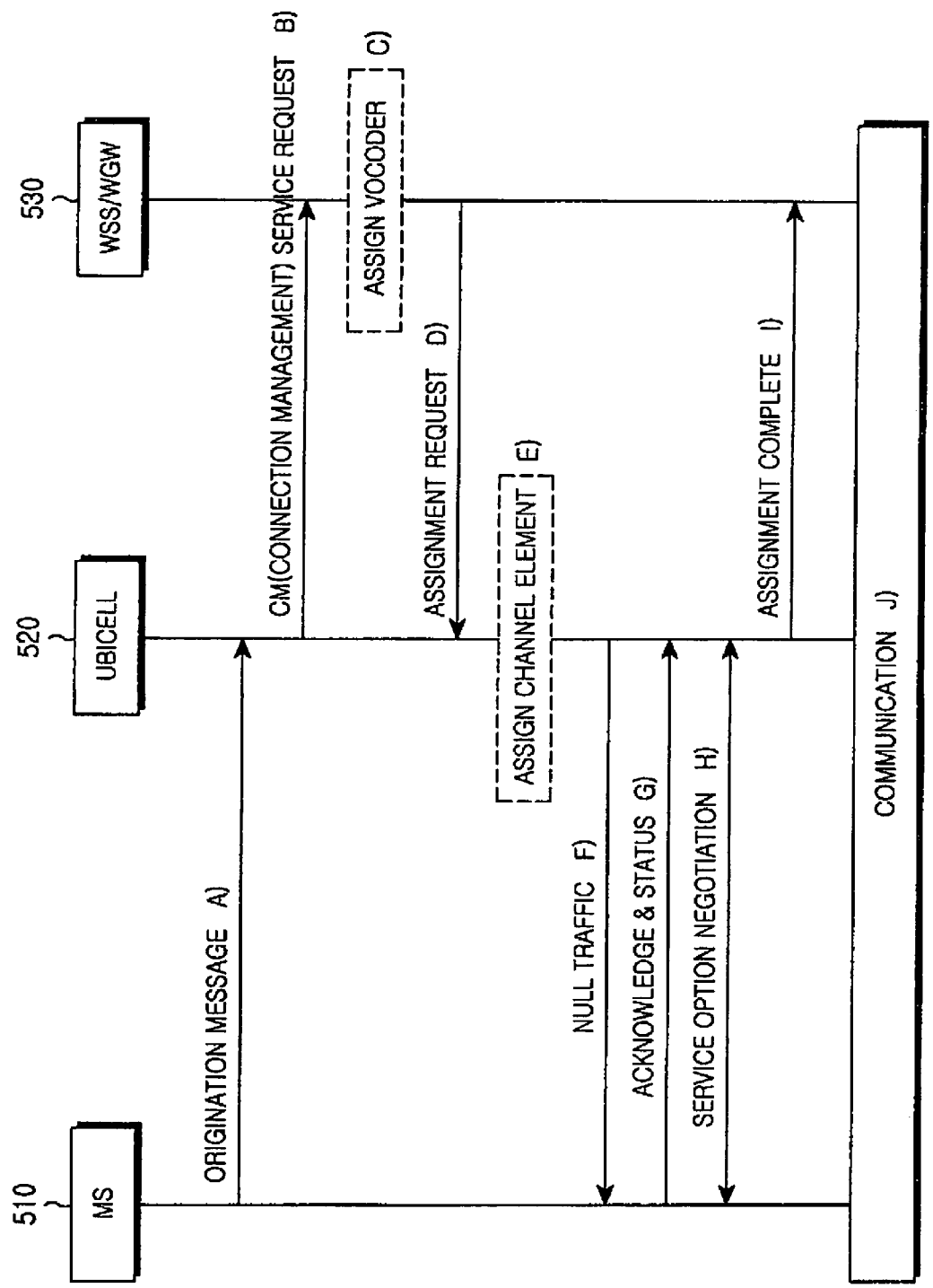
FIG. 5 is a diagram illustrating a signal flow for a network operation when the home BTS is used according to an exemplary embodiment of the present invention.

FIG. 5 is a diagram illustrating a signal flow for a network operation when a home BTS is used according to an exemplary embodiment of the present invention.

A call origination process depicted in FIG. 5 is similar to a conventional call origination process except that a vocoder resides in a WSS/WGW 530, particularly in the WSS as noted in step c), compared to the conventional technology where the vocoder is provided in a BTS.

This means that as a CODEC used for audio format conversion exists in the WGW, the load of a UbiCell 520 can be reduced and the WSS/WGW 520 can provide centralized management. In addition, the WSS/WGW 530 acts as the conventional MSC.

An MS 510 transmits an Origination Message to the UbiCell 520 in step a). The UbiCell 520 checks the Origination Message and transmits a Connection Management Service Request Message to the WSS/WGW 530, if the Origination Message is normal in step b). The Connection Management Service Request Message contains information about a CODEC used in the MS 510. In step c), the WSS/WGW 530 prepares a CODEC accordingly.

In step d), the WSS/WGW 530 transmits an Assignment Request Message commanding radio channel assignment to the MS 510 to the UbiCell 520 and the UbiCell 520 performing channel element assignment in step e).

The UbiCell 520 allocates a radio channel to the MS 510 in steps f), g) and h) and transmits an Assignment Complete Message to the WSS/WGW 530 in step i).

Then, a call is conducted in step j).

Figure 6:
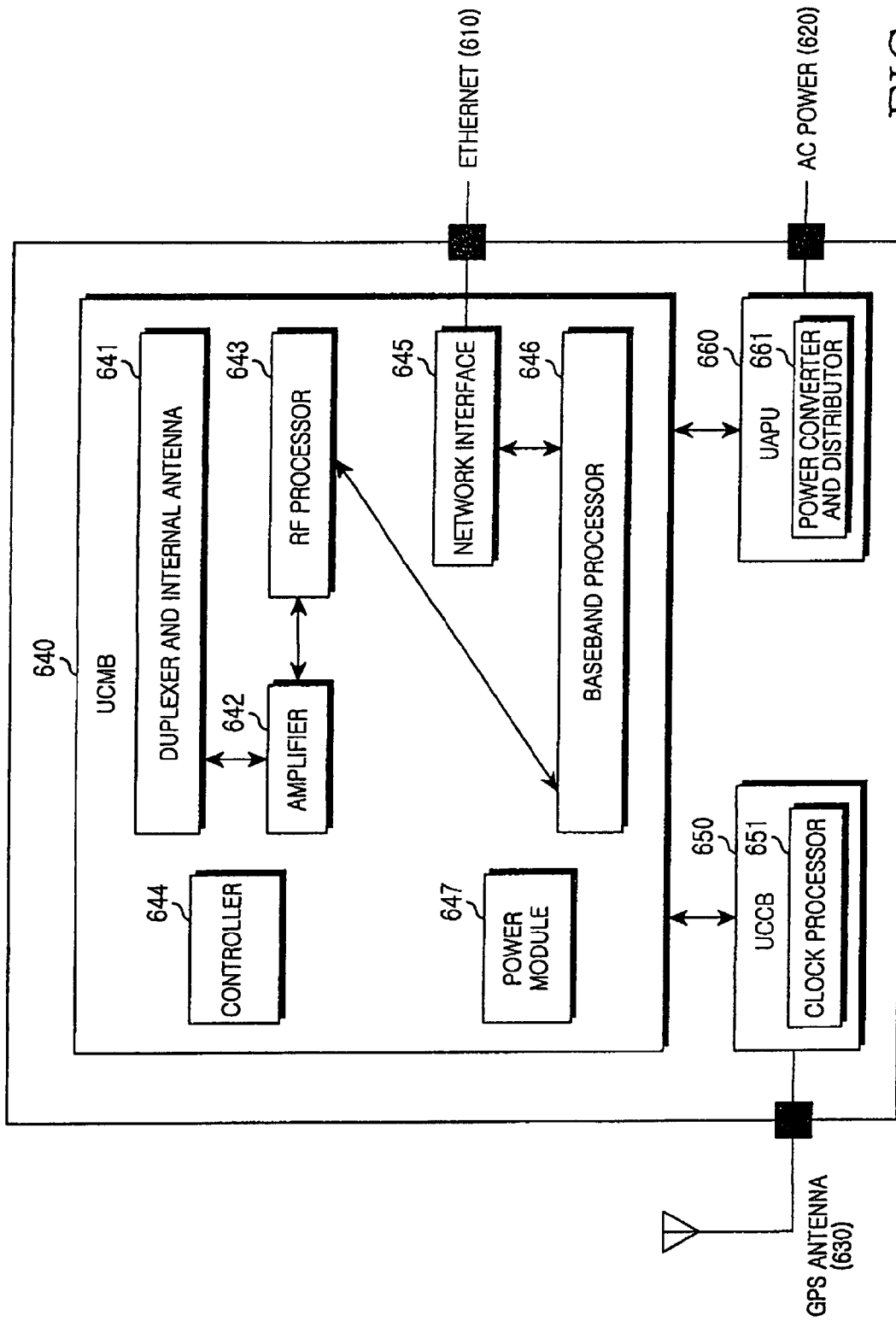
FIG. 6 is a block diagram of the home BTS according to an exemplary embodiment of the present invention.

FIG. 6 is a block diagram of the home BTS according to an exemplary embodiment of the present invention.

Referring to FIG. 6, the home BTS (or UbiCell) includes a UbiCell Main Board (UCMB) 640, a UbiCell Clock Board (UCCB) 650, and a UbiCell Alternating Current (AC) Power Unit (UAPU) 660.

The UCMB 640 is provided with a controller 644, a duplexer and internal antenna 641, an amplifier 642, an RF processor 643, a network interface 645, a baseband processor 646, and a power module 647. The network interface 645 is connected to ETHERNET 610.

The UCMB 640 takes charge of the functions of the home BTS (or UbiCell), mainly through the controller 644. The controller 644 controls the components of the UCMB 640.

The UCCB 650 has a clock processor 651 for providing and controlling a Global Positioning System (GPS) clock signal and connected to GPS antenna 630.

The UAPU 660 includes a power converter and distributor 661 for supplying power to the UCCB 650 and the UCMB 640, converting AC power to Direct Current (DC) power, and distributing the DC power. The power converter and distributor 661 is connected to AC power 620.

Figure 7:
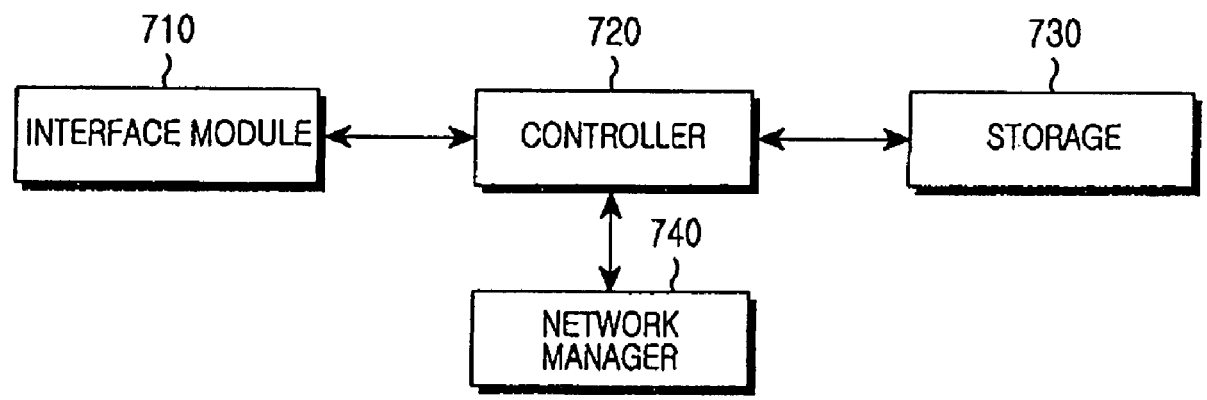
FIG. 7 is a block diagram of a Wireless Soft Switch/Wireless GateWay (WSS/WGW) or a UbiCell Manager (UCM) according to an exemplary embodiment of the present invention.

FIG. 7 is a block diagram of the WSS/WGW or the UCM according to an exemplary embodiment of the present invention.

Referring to FIG. 7, each of the WSS/WGW and the UCM includes an interface module 710, a controller 720, a storage 730, and a network manager 740.

The interface module 710 is used for communications with another node and includes a wired processor module and a baseband processor module. The wired processor module converts a signal received via a wired interface to a baseband signal and provides the baseband signal to the baseband processor module. It also converts a baseband signal received from the baseband processor module to a wired signal and transmits the wired signal via the wired interface.

The controller 720 is responsible for basic processing and control of the WSS/WGW or the UCM. For example, the controller 720 processes and controls data communications. In addition to the conventional functionalities, the controller 720 performs the afore-described functions specific to the WSS/WGW or the UCM by controlling the network manager 740 according to an exemplary embodiment of the present invention.

The storage 730 stores a program for providing overall control to the WSS/WGW or the UCM and temporary data generated during program execution.

The network manager 740 performs the functions specific to the WSS/WGW or the UCM under the control of the controller 730.

The controller 720 may incorporate the functions of the network manager 740, while the controller 720 and the network manager 740 are shown separately for illustrative purposes.

Accordingly, all or part of the functions of the network manager 740 can be incorporated in the controller 720 in real product design.

As is apparent from the above description, an embodiment of the present invention enables provisioning of mobile communication services through an MS even in areas without a backhaul network used as a dedicated interface in a legacy mobile communication system or in certain hot spots.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A system using a packet network in a mobile communication system, comprising:
    a home Base Transceiver Station(BTS) for receiving a call request from a MS, transmitting a connection request for the MS, using Ethernet-based Virtual Private Network (VPN) function, to a switching center block, receiving a radio channel assignment request, using Ethernet-based Virtual Private Network (VPN) function, for radio channel assignment to the MS from the switching center block, performing a radio channel assignment procedure with the MS, when the radio channel assignment procedure is completed transmitting an assignment complete, using Ethernet-based Virtual Private Network (VPN) function, to the switching center block;
    the switching center block for performing a call control and mobility control function for the MS, receiving the connection request for the MS, using Ethernet-based Virtual Private Network (VPN) function, from the home BTS, transmitting the radio channel assignment request, using Ethernet-based Virtual Private Network (VPN) function, to the home BTS for radio channel assignment to the MS and receiving the assignment complete, using Ethernet-based Virtual Private Network (VPN) function; and
    a home BTS manager for providing information necessary for providing the mobile communication services to the home BTS and managing the home BTS,
    wherein the home BTS performs an adaptive Radio Frequency (RF) function, and
    wherein the home BTS provides handoff functionality to the MS for a handoff to a general BTS.

2. The system of claim 1, further comprising:
    a security gateway between the home BTS and upper network elements, for protecting a network of the mobile communication system against the packet network,
    wherein the home BTS provides fault information to the home BTS manager, performs automatic software download from the home BTS manager according to the seriousness of a fault, performs plug and play-based automatic configurations, and performs an adaptive Radio Frequency (RF) function.

3. The system of claim 2, wherein the home BTS sounds an alarm according to the type of fault upon generation of the fault.

4. The system of claim 2, wherein the plug and play-based automatic configurations include auto self-installation and configuration, auto Code Division Multiple Access (CDMA) channel selection, and auto CDMA Pseudo Noise (PN) planning.

5. The system of claim 2, wherein the home BTS manager provides information necessary for auto self-installation and configuration of the home BTS to the home BTS, downloads software according to a fault reported by the home BTS, and manages subscribers.

6. The system of claim 5, wherein the information necessary for auto self-installation and configuration of the home BTS includes a Medium Access Control (MAC) address, a Frequency Assignment (FA), a PN offset, and authentication information.

7. The system of claim 2, wherein the home BTS manager provides necessary information when the home BTS is initially powered-up and provides a software upgrade function to the home BTS.

8. The system of claim 7, wherein the necessary information includes a subscriber Electronic Serial Number/International Mobile Subscriber Identifier (ESN/IMSI), an Internet Protocol (IP) address, and security options.

9. The system of claim 2, wherein the security gateway uses IP Security (IPsec) as a security protocol.

10. The system of claim 1, wherein when the MS moves from the home BTS to the general BTS by handover, the home BTS provides a beacon by which the MS can sense the home BTS.

11. The system of claim 1, wherein the switching block comprising;
    a Wireless Soft Switch (WSS) for performing a call control and mobility control function for the MS through the home BTS, receiving the connection management service request message, using Ethernet-based Virtual Private Network (VPN) function, transmitting the channel assignment request message, using Ethernet-based Virtual Private Network (VPN) function, to the home BTS for radio channel assignment to the MS and, receiving the assignment complete message, using Ethernet-based Virtual Private Network (VPN) function; and
    a Wireless GateWay (WGW) for transcoding voice data transmitted from the MS via the home BTS, preparing the CODEC used in the MS, and communicating with the WSS.

12. The system of claim 1, wherein the connection request includes the information about the CODEC used in the MS.

13. A networking method using a packet network in a mobile communication system, comprising:
    receiving a call request from a Mobile Station(MS) by a home Base Transceiver Station (BTS);
    transmitting a connection request for the MS using Ethernet-based Virtual Private Network (VPN) function, to a switching center block by the home BTS;
    transmitting a radio channel assignment request, using Ethernet-based Virtual Private Network (VPN) function, to the home BTS for radio channel assignment to the MS by the switching center block when the switching center block receives the connection request for the MS, using Ethernet-based Virtual Private Network (VPN) function, from the home BTS;
    performing a radio channel assignment procedure with the MS by the home BTS when the home BTS receives a radio channel assignment request, using Ethernet-based Virtual Private Network (VPN) function, for radio channel assignment to the MS from the switching center block;
    transmitting an assignment complete, using Ethernet-based Virtual Private Network (VPN) function, to the switching center block by the home BTS when the radio channel assignment procedure is completed;
    providing handoff functionality to the MS for a handoff to a general BTS by the home BTS;
    providing information necessary for providing the mobile communication services to the home BTS and managing the home BTS; and
    performing an adaptive Radio Frequency (RF) function.

14. The networking method of claim 13, wherein the connection request includes the information about the CODEC used in the MS.

15. The networking method of claim 13, further comprising:
protecting a network of the mobile communication system against the packet network by a security gateway between the home BTS and upper network elements;
providing fault information to the home BTS manager by the home BTS;
performing automatic software download from the home BTS manager according to the seriousness of a fault by the home BTS; and
performing plug and play-based automatic configurations.

16. The networking method of claim 15, further comprising:
sounding an alarm according to the type of fault upon generation of the fault by the home BTS.

17. The networking method of claim 15, wherein the plug and play-based automatic configurations include auto self-installation and configuration, auto Code Division Multiple Access (CDMA) channel selection, and auto CDMA Pseudo Noise (PN) planning.

18. The networking method of claim 15, further comprising:
providing information necessary for auto self-installation and configuration of the home BTS to the home BTS by the home BTS manager;
downloading, by the home BTS manager, software according to a fault reported by the home BTS; and,
managing subscribers by the home BTS manager.

19. The networking method of claim 18, wherein the information necessary for auto self-installation and configuration of the home BTS includes a Medium Access Control (MAC) address, a Frequency Assignment (FA), a PN offset, and authentication information.

20. The networking method of claim 15, further comprising:
providing necessary information by the home BTS manager when the home BTS is initially powered-up and providing a software upgrade function to the home BTS.

21. The networking method of claim 20, wherein the necessary information includes a subscriber Electronic Serial Number/International Mobile Subscriber Identifier (ESN/IMSI), an Internet Protocol (IP) address, and security options.

22. The networking method of claim 15, further comprising:
using IP Security (IPsec) as a security protocol by the security gateway.

23. The networking method of claim 13, further comprising:
providing a beacon by which the MS can sense the home BTS by the home BTS when the MS moves from the home BTS to the general BTS by handover.

24. The networking method of claim 13, further comprising:
performing a call control and mobility control function for the MS through the home BTS by a Wireless Soft Switch (WSS) in the switching center block;
receiving the connection request, using Ethernet-based Virtual Private Network (VPN) function by a WSS in the switching center block;
transmitting the radio channel assignment request, using Ethernet-based Virtual Private Network (VPN) function, to the home BTS for radio channel assignment to the MS by a WSS in the switching center block;
receiving the assignment complete, using Ethernet-based Virtual Private Network (VPN) function by a WSS in the switching center block;
transcoding voice data transmitted from the MS via the home BTS by a Wireless GateWay (WGW) in the switching center block; and
preparing the CODEC used in the MS, and communicating with the WSS by a WGW in the switching center block.

25. A home Base Transceiver Station (BTS) apparatus using a packet network in a mobile communication system, comprising:
a controller for connecting to an upper node using Ethernet-based Virtual Private Network (VPN) function, providing a handoff function to a Mobile Station (MS) for a handoff to a general BTS, providing fault information to a home BTS manager, performing an automatic software download from the home BTS manager according to the seriousness of a fault, performing plug and play-based automatic configurations, performing an adaptive Radio frequency (RF) function, providing user information, an Internet Protocol (IP) address, and security options, upon power-up, performing a software upgrade function, and providing information about a Coder-Decoder (CODEC) used in the MS,
wherein the plug and play-based automatic configurations includes auto self-installation and configuration of a home BTS and information necessary for the auto self-installation and configuration includes a Medium Access Control (MAC) address, a Frequency Assignment (FA), a PN offset, and authentication information.

26. The home BTS apparatus of claim 25, wherein the home BTS provides a beacon by which the MS can sense the home BTS when the MS moves from the home BTS to the general BTS by a handover.

* * * * *